(12) United States Patent
Estevez-Garcia et al.

(10) Patent No.: US 6,199,428 B1
(45) Date of Patent: Mar. 13, 2001

(54) FLUID LEVEL MEASURING DEVICE

(75) Inventors: Jaime Estevez-Garcia, München; Francesco Volpe, Deisenhofen, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/401,389

(22) Filed: Sep. 22, 1999

(30) Foreign Application Priority Data

Sep. 22, 1998 (DE) ................................................ 198 43 437

(51) Int. Cl.[7] .......................... G01F 23/30; G01F 23/32; H01H 35/18
(52) U.S. Cl. ................. 73/305; 73/307; 73/317; 73/319; 73/320; 73/321; 200/84 C
(58) Field of Search ............... 73/305, 317, 319, 73/320, 321, 307; 200/84 C

(56) References Cited

U.S. PATENT DOCUMENTS 4,881,088 * 11/1989 Fisher, Jr. et al. ............... 346/140 R
5,426,271 * 6/1995 Clark et al. ......................... 200/84 C
5,648,885 * 7/1997 Nishioka et al. .................... 360/113
5,649,450 * 7/1997 Glab et al. ............................ 73/307

FOREIGN PATENT DOCUMENTS 0 680 614 B1   11/1995  (EP) .

* cited by examiner

*Primary Examiner*—Hezron Williams
*Assistant Examiner*—Dennis Loo
(74) *Attorney, Agent, or Firm*—Herbert L. Lerner; Laurence A. Greenberg; Werner H. Stemer

(57) ABSTRACT

A fluid level measuring device for measuring a fluid filling level in a container contains a float disposed in the container and a magnet disposed in the container. The magnet is coupled to the float in terms of movement and, in the event of a change in the fluid filling level, executes a movement that corresponds to a change in fluid level. A magnetic field sensor is disposed in a zone of influence of a magnetic field generated by the magnet and outputs an electrical signal which is representative of a height of the fluid level.

14 Claims, 3 Drawing Sheets

FLUID LEVEL MEASURING DEVICE

BACKGROUND OF THE INVENTION

Field of the Invention

In many technical systems or apparatuses it is necessary to measure the fluid level of a container filled with a fluid.

It is already known to use for this purpose a measuring apparatus having a float and a mechanical-electrical movement pickup coupled to the latter. The movement pickup detects a change in the position of the float caused by the variable fluid level and, at its output, provides an electrical signal which is characteristic of the height of the fluid level.

In many applications, it is necessary to measure the fluid level of inflammable or explosive fluids. In these cases, generating an electrical signal in the container and passing it through the container wall often cannot be tolerated for safety reasons, which is why structurally complicated mechanical bushings are used.

A further disadvantage of known fluid level measuring devices consists in the use of complicated configurations that are cost-intensive and, in some instances, also maintenance-intensive. Fluid level measuring devices of this type are not appropriate for installation in commodity and/or disposable products, on account of their high costs.

Further difficulties arise in the case of measuring fluid filling levels in miniature containers, since known fluid level measuring devices frequently have a physical volume that is too large for such applications.

European Patent EP 680 614 B1 discloses an apparatus for detecting an angular position of an object by a giant magneto resistor (GMR) sensor.

SUMMARY OF THE INVENTION

It is accordingly an object of the invention to provide a fluid level measuring device which overcomes the above-mentioned disadvantages of the prior art devices of this general type, which is constructed in a simple manner, can be produced in a cost-effective manner and can be employed advantageously in particular in the case of measuring the fluid level of inflammable or explosive fluids or else in case of use in disposable products having, if appropriate, a small physical size.

With the foregoing and other objects in view there is provided, in accordance with the invention, in a container containing a fluid, a fluid level measuring device for measuring a fluid filling level in the container, the fluid level measuring device including:

a float disposed in the container and having a given relative density less than a relative density of the fluid;

a magnet generating a magnetic field disposed in the container and coupled to the float in terms of movement and, in an event of a change in the fluid filling level the magnet executes a movement corresponding to the change in the fluid filling; and a magnetic field sensor disposed outside of the container in a zone of influence of the magnetic field generated by the magnet and outputs an electrical signal representative of a height of the fluid filling level of the container, the magnetic field sensor serving to obtain contactless information concerning the fluid filling level and the magnetic field sensor being a magnetoresistive sensor.

An essential aspect of the invention is for the magnetic field generated by the magnet to be detected by the magnetic field sensor and for information concerning the fluid level in the container to be obtained as a result of this, the information being obtained contactlessly. In this case, just the combination containing the float and the magnet, that is to say products that can be produced in an extremely cost-effective manner, is contained in the container.

A magnetoresistive sensor is preferably used as the magnetic field sensor. Magnetoresistive sensors generally have a thin layer made of a magnetoresistive material (for example Ni, Fe, Co, NiFe) which is magnetized in the plane of the layer. In the event of a rotation of the magnetization of the layer with respect to the direction of a measurement current flowing in the layer, the electrical resistance of the layer changes, and this change can be detected and measured as the signal which is representative of the height of the filling level of the container.

It is particularly preferable to use a giant magneto resistor (GMR) sensor for generating the electrical signal which is representative of the height of the filling level. A GMR sensor is a magnetic field sensor that is constructed from a magnetic multilayer system and has a particularly pronounced magnetoresistive effect. A GMR sensor that can be used according to the invention is described in European Patent EP 0 680 614 B1, for example.

With the use of a GMR sensor large measurement distances and adjustment tolerances between the GMR sensor and the magnet are made possible, and it is possible to attain virtually complete interference immunity with respect to changes in the measurement distance during use. This is due to the fact that the GMR sensor, in contrast to other known magnetic field sensors (for example Hall sensors), when configured suitably, measures only the direction—which is essentially independent of the measurement distance—of an external magnetic field with respect to a predetermined reference direction of the GMR sensor and not the intensity thereof.

A structurally simple embodiment variant of the invention is characterized by the fact that the magnet is a bar magnet.

The coupling between the magnet and the float can be realized in diverse ways depending on the specific application. A simple and much preferred measure consists in the magnet being coupled directly to the float, that is to say without the interposition of an actuating mechanism.

According to a preferred exemplary embodiment of the invention, the magnet is articulated on the container in a manner allowing it to rotate about an axis of rotation oriented essentially parallel to the filling level surface of the fluid. In this case, the axis of rotation may run through the magnet for example in a central region or in an end region in the transverse direction.

An alternative exemplary embodiment is characterized by the fact that the magnet is guided by a link in the container, the link extending essentially perpendicularly to the filling level surface.

The magnet and the float may also expediently be realized in the form of a single structural unit. By way of example, this structural unit may be realized by an optionally foamed plastic material with incorporated ferrite particles.

Other features which are considered as characteristic for the invention are set forth in the appended claims.

Although the invention is illustrated and described herein as embodied in a fluid level measuring device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2b is a circuit diagram of an evaluation circuit for measuring an electrical resistance of a GMR sensor containing the GMR resistor shown in FIG. 2a;

FIG. 3b is a plan view of the liquid container illustrated in FIG. 3a; and

DESCRIPTION OF THE PREFERRED EMBODIMENTS

Figure 1A:
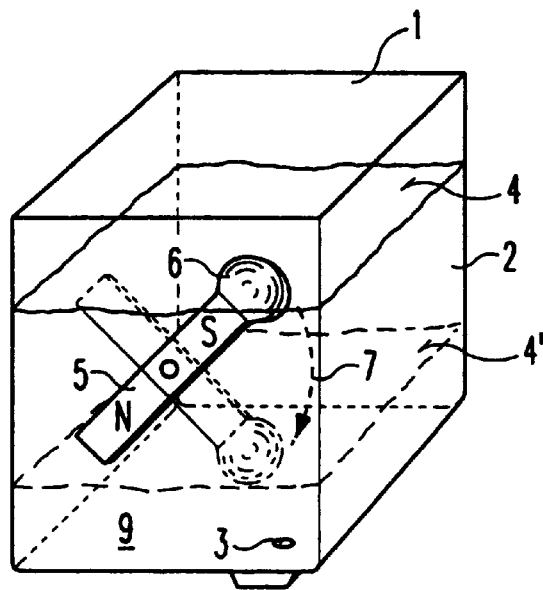
FIG. 1a is a diagrammatic perspective view of a liquid container with, contained therein and mounted rotatably, a bar magnet with a float according to the invention.

In all the figures of the drawing, sub-features and integral parts that correspond to one another bear the same reference symbol in each case. Referring now to the figures of the drawing in detail and first, particularly, to FIG. 1a thereof, there is shown a closed container 1 filled with a liquid 2. The container 1 may be, by way of example, an ink-filled supply container for an ink jet printer.

On its underside, the container 1 has an outlet opening 3, via which the liquid 2 can leave the container 1. Furthermore, in a manner that is not illustrated, ventilation openings disposed in a cover region, if appropriate, are provided in order to ventilate the container 1.

The liquid 2 has different liquid levels depending on the filling level, an upper liquid level 4 being illustrated by solid lines and a lower liquid level 4' being illustrated by broken lines. Furthermore, a bar magnet 5 is situated in the interior of the container, a float 6 being fitted to one pole end (in this case: the south pole) of the bar magnet 5. The bar magnet 5 is articulated on the container 1 in a manner allowing it to rotate in its longitudinal center region, the buoyancy experienced by the float 6 in the liquid 2 always ensures that the float end of the bar magnet 5 is situated at the height of the current liquid level 4 or 4'.

Accordingly, in the event of the liquid level 4 dropping to the deeper (lower) liquid level 4', the bar magnet 5 rotates in accordance with the arrow direction of line 7 of movement, which is shown as a broken line. The position of the magnet 5 in the case of the liquid level 4' is likewise illustrated by broken lines in FIG. 1a.

Figure 1B:
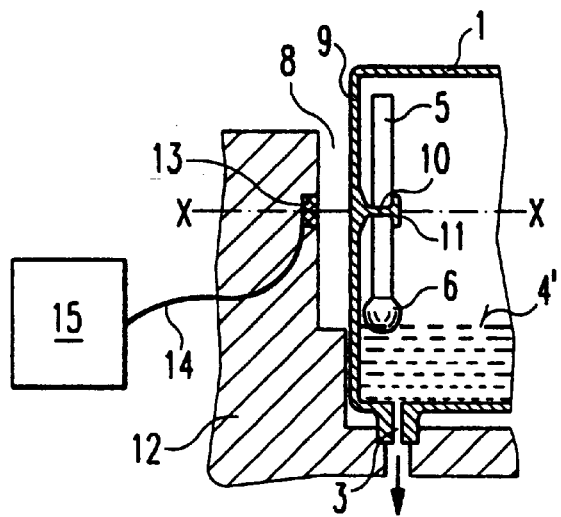
FIG. 1b is a sectional view of the container shown in FIG. 1a, inserted into an apparatus.

FIG. 1b shows the container 1 inserted into an installation receptacle 8 of an apparatus that is not illustrated in any more detail, for example an inkjet printer. An axis X of rotation of the magnet 5 with the float 6 is realized by an axle projection 10 formed integrally with a side wall 9 of the container 1 and the axle projection 10 has an extension 11 at its free end. The extension 11 securing the magnet 5 against falling away.

On a housing portion 12, fixed to the apparatus, of the installation receptacle 8, a GMR sensor 13 is preferably positioned in such a way that the axis X of rotation extends through the GMR sensor 13. The GMR sensor 13 is connected via an electrical connection 14 to an evaluation circuit 15 that measures the electrical resistance of the GMR sensor 13.

In the event of a rotary movement of the magnet 5 caused by a change in the liquid level, the direction of the magnetic field appearing at the location of the GMR sensor 13 changes. The GMR sensor 13, which is sensitive to a change in the direction of the magnetic field, thereupon changes its electrical resistance, the change in resistance being registered by the evaluation circuit 15, as already mentioned.

Since the measured value acquisition is not of an inductive nature, the rotational speed of the magnet 5 does not have an essential part to play, that is to say the quasi-static movement processes that typically occur in the event of changes in the fluid level can readily be detected. Furthermore, the exact installation position of the container 1 in the housing portion 12 and thus the measurement distance between the magnet 5 and the GMR sensor 13 is largely unimportant since they do not significantly influence the direction of the magnetic field generated by the magnet 5 at the location of the GMR sensor 13.

In a manner that is not illustrated, the bar magnet 5 can also be articulated pivotably on the container 1 eccentrically with respect to its longitudinal extent, for example at its end remote from the float 6 (north pole). This variant has the advantage that a larger measurement range can be monitored on account of the lengthened line 7 of movement of the float 6 in that case. However, a lower degree of measurement accuracy of this variant may or may not be disadvantageous, this being attributable to the fact that an identical change in the fluid level results in a comparatively smaller angular adjustment of the bar magnet 5.

Figure 2A:
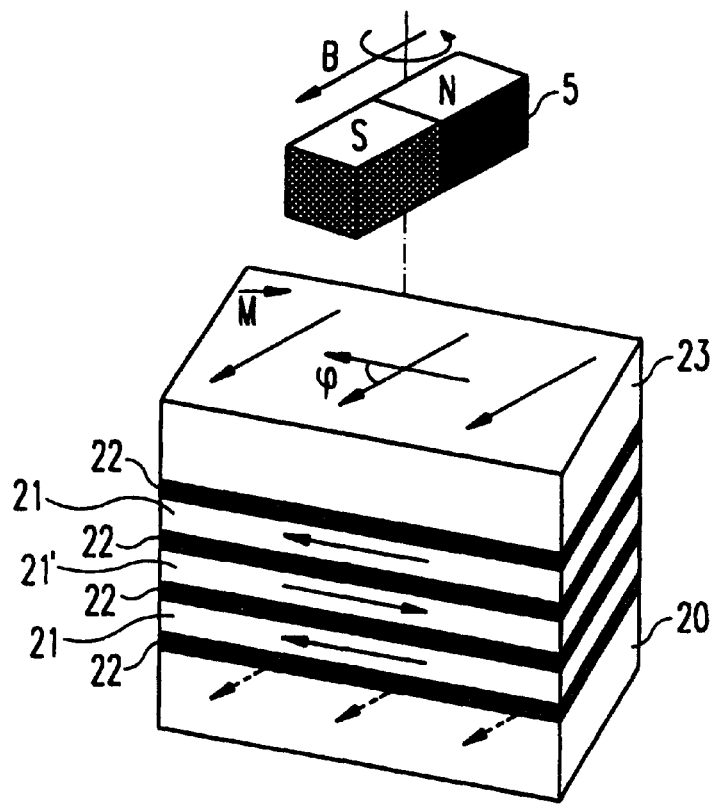
FIG. 2a is a perspective view of a construction of a GMR resistor.

FIG. 2a serves for explaining the measurement principle with the use of the GMR sensor 13 and, for this purpose, shows in an exemplary manner a fundamental layer structure of a GMR resistor present in the sensor 13 of this type.

A multi-layer system containing alternately disposed non-magnetic Cu layers 22 and hard magnetic Co layers 21, 21' is formed over a lower Fe layer 20. The magnetizations of the Co layers 21, 21' illustrated by arrows are oriented in an anti-parallel manner, given a suitable thickness of the intervening Cu layers 22, with respect to successive layers 21 and 21', that is to say that the Cu—Co multilayer system 21, 21', 22 realizes an artificial anti-ferromagnet. An upper covering layer 23 made of Fe is applied over the multi-layer system 21, 21', 22.

In the case of an external magnetic field B corresponding to an orientation of the bar magnet 5, a magnetization M of the upper soft magnetic Fe covering layer 23 is established parallel to the external magnetic field B. The hard magnetic Co layers 21, 21' retain their predetermined anti-parallel magnetizations. The electrical resistance, referred to as GMR resistance, of the Cu—Co multi-layer system 21, 21', 22 in the layer direction is dependent on the angle $\phi$ between the direction of the magnetization M of the Fe covering layer 23 and the reference direction defined by the alternating magnetization of the Cu—Co multi-layer system 21, 21', 22, that is to say changes with the direction of the external magnetic field B.

Provided that the external magnetic field B has a sufficient strength for the complete magnetization reversal of the Fe covering layer 23, the GMR resistance is not dependent on the strength of the magnetic field B. For this reason, the GMR sensor 13 is preferably operated in a saturation region, that is to say with complete orientation of the magnetization M of the Fe covering layer 23 in the direction of the external magnetic field B, and is then sensitive exclusively to changes in the direction of the external magnetic field B.

Given a suitable configuration of the GMR sensor 13, the saturation region may already be reached at a magnetic field strength of approximately 3 kA/m or less. In this case, it is possible to achieve a maximum measurement distance of approximately 25 mm or more between the GMR sensor 13 and the magnet 5.

Figure 2B:
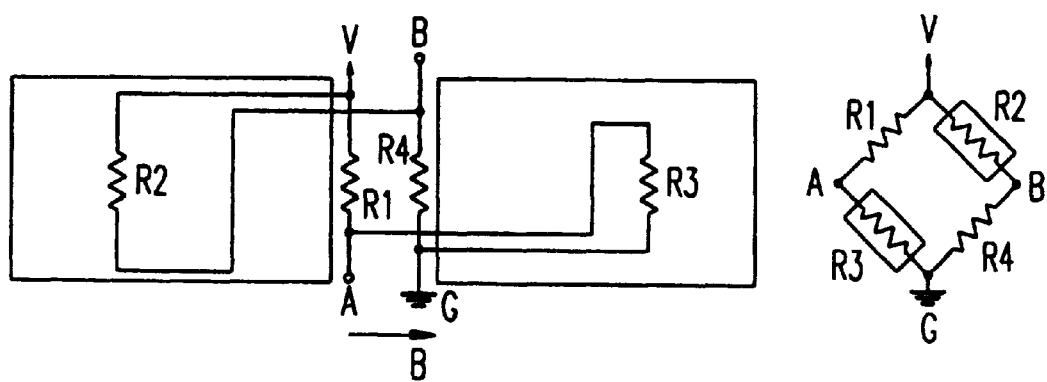

According to FIG. 2b, the GMR sensor 13 can contain, by way of example, two GMR resistors R1, R4, which are connected up in the form of a Wheatstone bridge using two comparison resistors R2, R3. The two comparison resistors R2, R3 may be customary non reactive (that is to say magnetic field-independent) resistors or GMR resistors which are formed in the GMR sensor 13 and are shielded from the external magnetic field B. However, R2, R3 may also be magnetic field-dependent.

A predetermined operating voltage or a predetermined constant current is applied to the Wheatstone bridge circuit R1, R2, R3 and R4 via a terminal V, a terminal G being at ground potential. A change in the resistance of the GMR resistors R1 and R4 can then be detected as a voltage change at bridge taps A and B.

An equivalent circuit diagram of the circuit illustrated in the left-hand part of FIG. 2b is shown in the right-hand part of FIG. 2b.

Figure 3A:
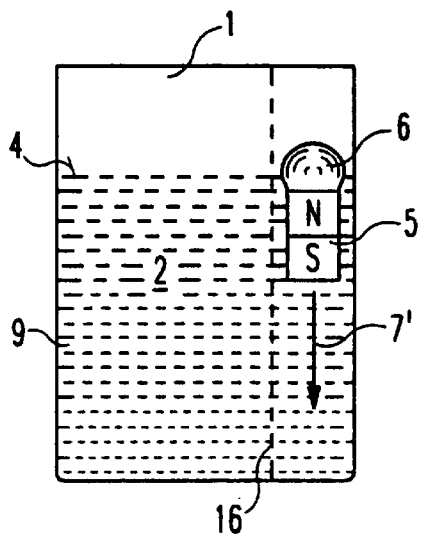
FIG. 3a is a sectional view of a liquid container with, contained therein, the bar magnet and the float in accordance with a further exemplary embodiment of the invention.
Figure 3B:
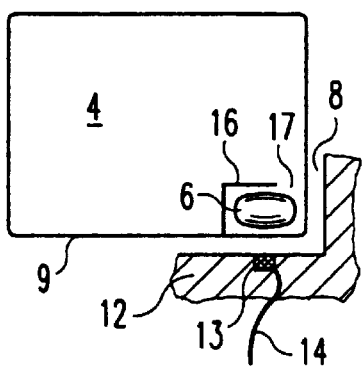

FIGS. 3a and 3b show a further exemplary embodiment of the invention, in which parts comparable to those in the previous figures are identified by identical reference symbols.

In this case, the bar magnet 5 with the float 6 is freely moveable in the vertical direction in the container 1 and is held just by a link 16, which runs essentially vertically and has a rectangular cross section, in the vicinity of the side wall 9 of the container, for example in a corner region of the container 1. The link 16 has one or more optionally gap-like passage openings 17 via which the inner region of the link 16 is connected to the remaining volume of the container in fluid exchange terms.

The GMR sensor 13 is again disposed on the housing portion 12, fixed to the apparatus, of the installation receptacle 8 opposite a line 7' of movement of the bar magnet 5 with the float 6, the line of movement being predetermined by the link 16. Depending on the desired measurement task, the GMR sensor 13 may be positioned for example approximately at half the height of the container 1 or in the region of the container 1 that is near the bottom. If the GMR sensor 13 is positioned approximately at half the height of the container 1, it can register the position of the bar magnet 5 both in the approach region, lying above the GMR sensor 13, and in the remote region, lying below it, of the line 71 of movement. The GMR sensor 13 disposed in the region of the container 1 that is near the bottom can be used for example as a signal generator for a reserve or container changeover display. It is also possible to disposed a multiplicity of the GMR sensors 13 along the line 7' of movement and, in this way, to obtain a lengthened measurement range.

The GMR sensor 13 can also be disposed at a predetermined distance in a laterally offset manner with respect to the line 7' of movement of the bar magnet 5 with the float 6.

Figure 4:
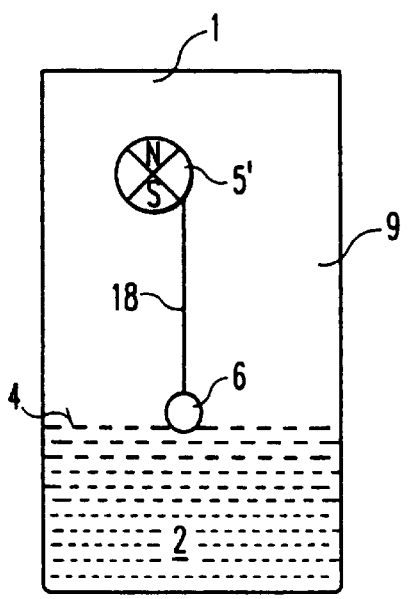
FIG. 4 is a sectional view of a further exemplary embodiment of the present invention.

FIG. 4 shows a further exemplary embodiment of the invention, in which parts corresponding to those in the figures described above are again provided with the same reference symbols.

The container 1 is filled with the liquid 2 up to the filling level (liquid level 4). The float 6 floats on the liquid 2 and is fastened to one end of a cord 18, the other end of which is wound onto a take-up reel which, in a concealed fashion in FIG. 4, is situated behind a magnetic disk 5' and is coupled to the latter in a manner fixed against rotation. The take-up reel and the magnetic disk 5' are situated in the container 1 and can be fitted rotatably to the latter in a similar manner to that illustrated in FIGS. 1a and 1b.

Furthermore, the take-up reel is coupled to a restoring spring which exerts a force acting in the counterclockwise direction on the take-up reel, the strength of the force being chosen such that the cord 18 is always held in a tensioned manner irrespective of the height of the fluid level.

Outside the container 1, the GMR sensor 13 is fitted such that it is situated opposite and preferably coaxial with the magnetic disk 5', in a manner that is not illustrated.

If the liquid level 4 falls, the cord 18 unwinds from the take-up reel and at the same time rotates the direction of the magnetic field generated by the magnetic disk 5'. In the manner that has already been described, this adjustment of the direction of the magnetic field can be detected by the GMR sensor 13 as a change in the resistance thereof and can be detected in a suitable manner by the evaluation circuit 15.

The exemplary embodiment illustrated in FIG. 4, similarly to the exemplary embodiment shown in FIGS. 1a and 1b, is based on conversion of a linear movement of the liquid level 4 into a rotary movement of the magnet 5 or 5', but, in comparison with the latter, has a significantly larger measurement range.

In functional terms, all of the exemplary embodiments illustrated are directly comparable with one another, and they always enable a liquid fluid level 4 in a container 1 to be measured simply, contactlessly and in a manner allowing extremely diverse application in particular on account of the low costs of the components (magnet 5, float 6) required in the container 1.

We claim:

1. In a container containing a fluid, a fluid level measuring device for measuring a fluid filling level in the container, the fluid level measuring device comprising:
    a float disposed in the container and having a given relative density less than a relative density of the fluid;
    a magnet generating a magnetic field disposed in the container and coupled to said float in terms of movement and, in an event of a change in the fluid filling level said magnet executes a movement corresponding to the change in the fluid filling; and
    a giant magneto resistor sensor disposed outside of the container in a zone of influence of the magnetic field generated by said magnet and outputs an electrical signal representative of a height of the fluid filling level of the container, said giant magneto resistor sensor serving to obtain contactless information concerning the fluid filling level.

2. The fluid level measuring device according to claim 1, wherein said magnet is a bar magnet.

3. The fluid level measuring device according to claim 1, wherein said magnet is coupled directly to said float without an interposition of an actuating mechanism.

4. The fluid level measuring device according to claim 1, wherein the fluid filling level has a surface and said magnet is articulated on the container in a manner allowing it to rotate about an axis of rotation oriented substantially parallel to the surface of the fluid filling level.

5. The fluid level measuring device according to claim 4, wherein said magnet has a central region and the axis of rotation runs through said central region of said magnet in a transverse direction.

6. The fluid level measuring device according to claim 4, wherein said magnet has an end region and the axis of rotation runs through said end region of said magnet in a transverse direction.

7. The fluid level measuring device according to claim 1, including a link disposed in the container for guiding said magnet, said link extending substantially perpendicularly to a surface of the fluid filling level.

8. The fluid level measuring device according to claim 1, wherein said magnet and said float are realized in a form of a single structural unit.

9. The fluid level measuring device according to claim 8, wherein said magnet and said float are realized in a form of a single plastic ferrite powder structure.

10. The fluid level measuring device according to claim 1, wherein the container is a supply container for a consumable liquid.

11. The fluid level measuring device according to claim 1, wherein the container is an ink container for an ink jet printer unit.

12. The fluid level measuring device according to claim 1, wherein said magnetic is a permanent magnet.

13. The fluid level measuring device according to claim 1, wherein the movement is a rotational movement.

14. The fluid level measuring device according to claim 1, wherein the movement is a linear movement.

* * * * *